C. G. HOWARD.
HOG FEEDING APPARATUS.
APPLICATION FILED JULY 6, 1910.
982,678.
Patented Jan. 24, 1911.
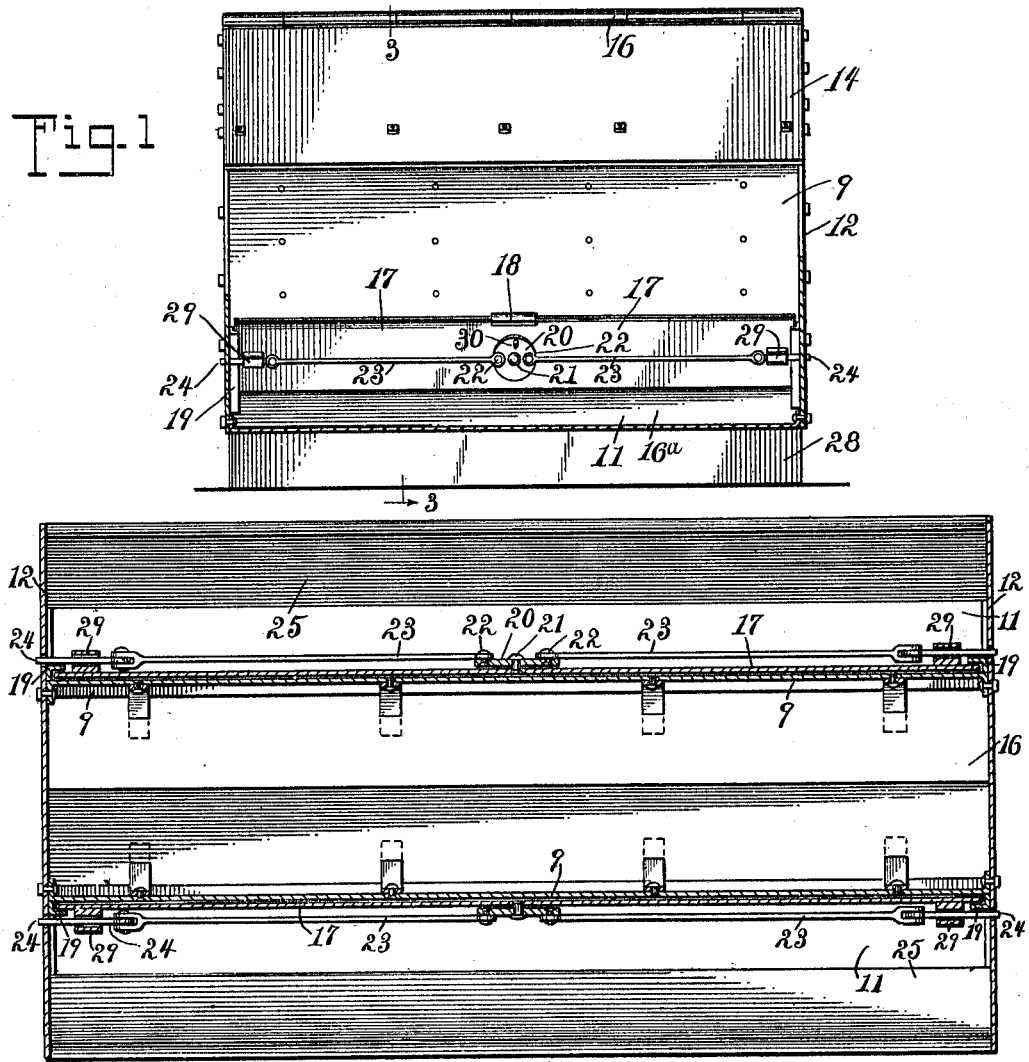
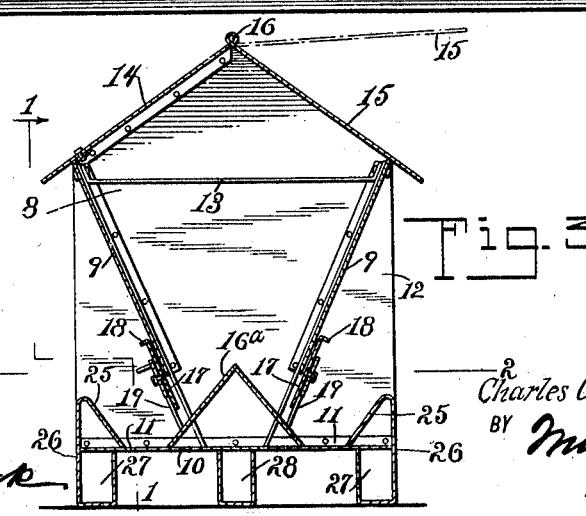
WITNESSES:
J. A. Brophy
INVENTOR
Charles Guy Howard
BY
ATTORNEYS

UNITED STATES PATENT OFFICE.

CHARLES GUY HOWARD, OF EXETER, NEBRASKA.

HOG-FEEDING APPARATUS.

982,678.

Specification of Letters Patent. Patented Jan. 24, 1911.

Application filed July 6, 1910. Serial No. 570,557.

*To all whom it may concern:*

Be it known that I, CHARLES GUY HOWARD, a citizen of the United States, and a resident of Exeter, in the county of Fillmore and State of Nebraska, have invented a new and Improved Hog-Feeding Apparatus, of which the following is a full, clear, and exact description.

Among the principal objects which the present invention has in view are: to provide an apparatus for feeding cattle, and more particularly swine, which may be arranged to regulate the rate of delivery of the food; to provide an apparatus of the character described where the door for delivering the food may be readily and quickly adjusted; and to provide a construction which is simple, economical and durable.

One embodiment of the present invention is disclosed in the structure illustrated in the accompanying drawings, in which like characters of reference denote corresponding parts in all the views, and in which—

Figure 1 is a side elevation, partly in section, of the apparatus, the section being taken on the line 1—1 in Fig. 3; Fig. 2 is a horizontal section taken on the line 2—2 in Fig. 3; and Fig. 3 is a vertical cross section taken on the line 3—3 in Fig. 1.

The apparatus, as illustrated in the accompanying drawings, comprises a hopper 8, the inclined sides 9, 9 whereof are disposed substantially as shown in Fig. 3 of the drawings, to converge toward the center of the bottoms 10, 10 of the troughs 11, 11. The sides 9, 9 are supported in end pieces 12, 12, and are reinforced at their upper edges against spreading by tie bars 13, 13. The hopper 8 is covered by a pitched roof formed by a suspended side 14 and a door side 15. The door side 15 is hinged at 16 to the upper ridge of the roof to swing upward, as shown in broken lines in Fig. 3 of the drawings. With the door 15 raised the hopper may be filled with any suitable fodder, such as corn, nuts or swill.

The bottom of the hopper 8 is formed by a longitudinally disposed ridge 16ª. The lower extensions of the sides of the ridge 16ª pass beyond the hopper 8 and form the inner sides of the troughs 11. The sides 9, 9 of the hopper at the lower edge are removed from the sides of the ridge 16ª to form a passage between the sides 9, 9 and the said ridge. This passageway is controlled by sliding doors 17, 17. The doors 17, 17 are provided at the upper edges with out-turned extensions 18, 18 whereby they are raised and lowered, or otherwise manually operated. The doors slide on the out-turned flanges 19, 19, as seen in the drawings. The doors have secured thereon, and located about centrally therewith, a disk 20. The disk 20 is pivotally mounted at 21 upon each door 19, and pivotally connected at 22, 22 to rods 23, 23, which rods 23, 23 are connected with end bolts 24, 24. The bolts 24, 24 may extend through perforations provided in the end pieces 12, 12 to form adjustable holds for the doors 17.

The troughs 11, 11 are formed by inclined sides 25, 25 which are over-bent from plates 26, 26 forming side channels 27, 27, which channels constitute the members upon which the apparatus rests. A channel 28 is formed from suitable sheet metal in the manner shown in Fig. 3 of the drawings, and disposed longitudinally on the median line of the apparatus, being secured firmly and rigidly by any suitable method to the end pieces 12, 12.

It will be understood that in so far as possible all of the members described and shown in the accompanying drawings are constructed from metal, the sides and top, as well as the framing channels below the floor of the troughs, being constructed from sheet metal, while the rods, bolts and disk forming the lock for the doors 17, are preferably formed of bar and plate metal. The bolts 24, 24 are slidably mounted in guide loops 29, 29.

The operation of the invention is as follows: The hopper 8 having been supplied, the material therein deposited is permitted to run into the troughs 11, 11 by adjusting the doors 17, 17. The doors 17 are raised and lowered by the extensions 18. To permit the movement of the doors 17 the disk 20 is rotated. To manipulate the disk 20 the operator engages the handle 30 thereof. When the disk is thus rotated, the rods 23 and bolts 24 connected therewith are contracted, so that the bolts 24 are withdrawn from engagement with the perforations in the end pieces 12, 12. When the doors 17, 17 are properly adjusted, the disks 20, 20 are rotated in a direction the reverse of that formerly described, to extend outward the bolts 24, 24 to engage the perforations in the said end pieces 12, 12.

If desired, the handles 30, 30 may consist of removable pins, which are withdrawn as and when the doors are set, thus offering no obstruction for the damaging of the animal feeding in the troughs 11, 11.

Having thus described my invention, what I claim as new and desire to secure by Letters Patent is:—

A hog feeding apparatus comprising a hopper having sides inclined outwardly at the top; gabled end members closing said hopper; doors hinged to the upper angles of said end members; a ridge-like bottom for said hopper, the inclined sides whereof extend beyond the walls of said hopper to deliver the contents of said hopper upon the floor of troughs at both sides of said hopper; and a floor structure for said troughs formed from sheet metal longitudinally disposed rectangular sill members formed from bended sheet metal, said metal being raised above said floor and bent inwardly and downwardly to form the outer sides of said troughs, said bent sections forming in conjunction with the said ridge-like bottom inverted V-shaped troughs.

In testimony whereof I have signed this specification in the presence of two subscribing witnesses.

CHARLES GUY HOWARD.

Witnesses:
C. A. BICKEL,
J. C. WILSON.